Nov. 5, 1968 D. R BROSIOUS ET AL Re. 26,485

PINHOLE DETECTORS

Original Filed May 3, 1963

5 Sheets-Sheet 1

INVENTORS
Daniel R. Brosious
BY James K. Hollingshead

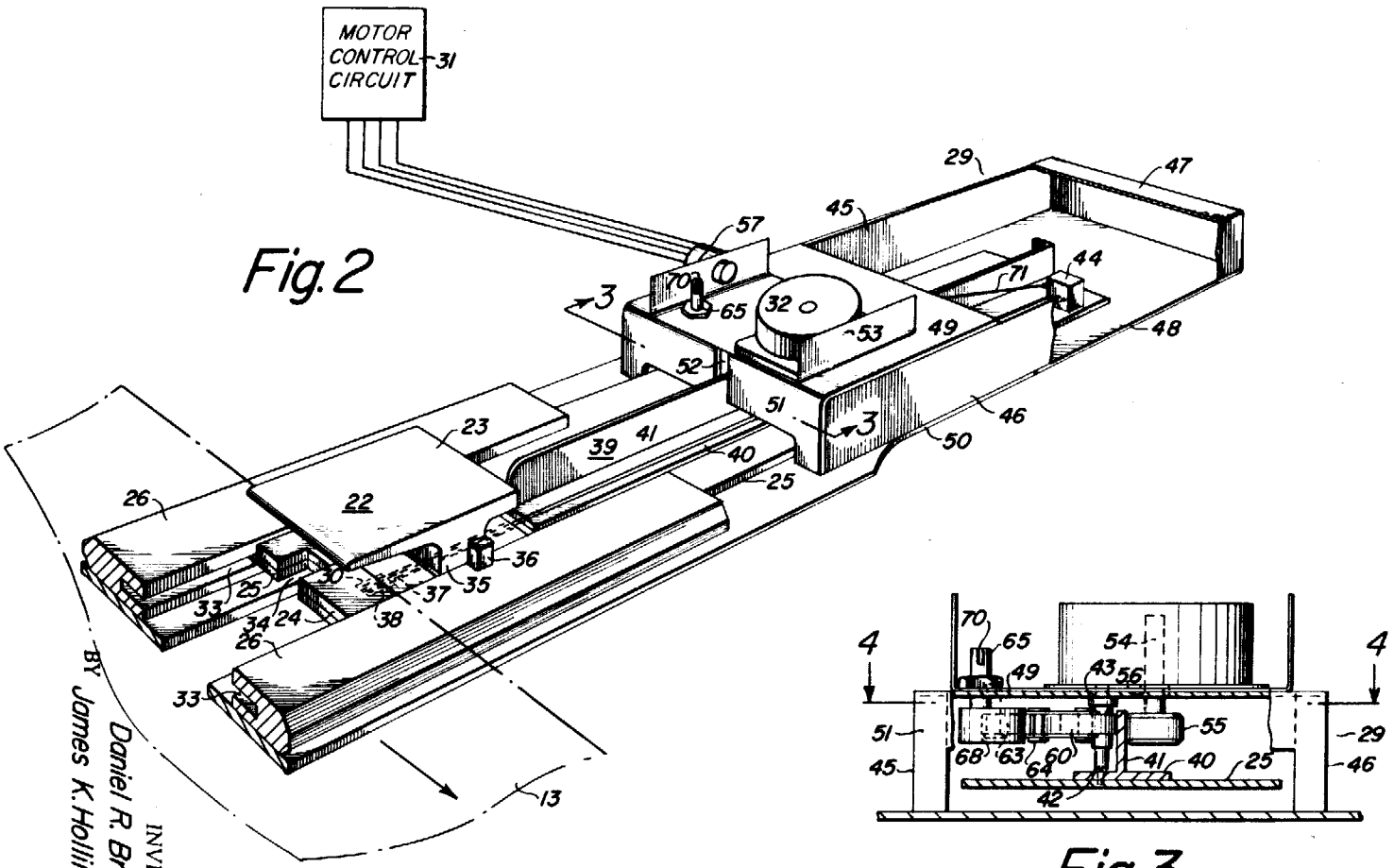
INVENTORS
Daniel R. Brosious
BY James K. Hollingshead

INVENTORS
Daniel R. Brosious
BY James K. Hollingshead

INVENTORS
Daniel R. Brosious
BY James K. Hollingshead

INVENTORS
BY Daniel R. Brosious
James K. Hollingshead

United States Patent Office

Re. 26,485
Reissued Nov. 5, 1968

26,485
PINHOLE DETECTORS

Daniel R. Brosious, Bethlehem, and James K. Hollingshead, Coopersburg, Pa., assignors, by mesne assignments, to Bethlehem Steel Corporation, a corporation of Delaware Original No. 3,263,086, dated July 26, 1966, Ser. No. 277,886, May 3, 1963. Application for reissue June 12, 1967, Ser. No. 651,637
5 Claims. (Cl. 250—219)

Matter enclosed in heavy brackets [ ] appears in the original patent but forms no part of this reissue specification; matter printed in italics indicates the additions made by reissue.

*ABSTRACT OF THE DISCLOSURE*

*An apparatus for detecting pinholes in moving strip in which light within first and second frequency ranges is directed toward the strip. A shutter containing a photoelectric cell is automatically positioned at each edge of the strip in response to light within the second frequency range, light within the first frequency range being absorbed by the shutters. A light filter across the detection chamber passes only light within the first frequency range, such light having been directionally controlled by louvers positioned above the strip.*

Background of the invention

This invention relates to apparatus for detecting imperfections in moving strip by photoelectric means, and more particularly to pinhole detectors of novel construction. The invention further relates to improved non-contacting shielding means which can be utilized in said pinhole detectors to improve the detection accuracy of said detectors.

Steel strip, particularly if it is subsequently to be coated with another metal, e.g. tin, is inspected for pinholes prior to the coating operation. The strip, which is accepted or rejected by the customer on the basis of the number of pinholes detected per area of material inspected, can thus be used in less critical applications if the density of pinholes is greater than that which is acceptable to tinplate customers.

Inspection is accomplished by means of a pinhole detector, which comprises a source of light positioned on one one side of the strip and light-sensitive means positioned on the other side of the strip. Pinholes are detected through the actuation of the light-sensitive means by light from the source which has passed through the pinholes in the strip.

Inasmuch as actuation of the light-sensitive means by light passing around an edge of the strip would result in false pinhole indications, pinhole detectors are provided with shielding means positioned adjacent each edge of the strip. The earliest types of shielding means comprised shutters which were fixed with respect to the detector housing and made no contact with the edges of the strip. These types of shielding means were not very accurate, as slight variations in the width of the strip and lateral movement thereof resulted in false pinhole indications. In addition, shutters which were fixed with respect to the detector housing could not be used in continuous lines inasmuch as the width of the strip in said lines may suddenly change as a coil of strip of one width is followed into the detector by a coil of strip of a greater or lesser width.

Later types of shielding means comprised shutters of the movable, contacting type, i.e. the shutters were adapted to move in a direction transverse to the path of the moving strip, and a portion of each shutter continuously made contact with an edge of the moving strip. In devices of this type, which were considerably more accurate than shielding means of the fixed type, the shutter frequently had to be replaced due to the rapid wear of those surfaces of the shutter which made contact with the edge of the moving strip. Furthermore, the speed at which the strip could be inspected was limited to about 1000 feet per minute, inasmuch as at higher speeds vibration of the shutter resulted in loss of contact between the strip and the shutter.

More recently, shielding means have comprised shutters of the movable, non-contacting type. In these devices, each shutter is provided with sensing means provided for detecting the edge of the strip and control circuits are continuously actuated by said means to maintain the relative positions of the shutter and the edge of the strip constant. Such shutters, to be effective, have generally been constructed with a narrow throat section and have been maintained in close proximity to the edge of the strip. While constituting a considerable improvement over shutters of the fixed, non-contacting type and the movable, contacting type, said devices have proved impractical for inspecting strip moving at speeds up to 5000 and 6000 feet per minute. At such speeds wavy-edged strip frequently made contact with the shutter, resulting in excessive wear and damage thereto.

The light-sensitive means of the pinhole detector comprises a plurality of highly sensitive photo-multiplier tubes. Said tubes can detect light passing through a hole in the strip of 0.001 inch diameter. For this reason, all of the aforementioned types of shielding means were designed to block, in the vicinity of the edges of the strip, reflected light and light emitted from the source in planes both coplanar with and noncoplanar with planes perpendicular to the surface of the strip and parallel to the direction of strip travel. While each of the foregoing types of shielding means was fairly effective at blocking light emitted in planes coplanar with said planes, none was very effective at blocking either reflected light or light emitted in planes noncopolanar with said planes.

Summary of the invention

It is an object of this invention to provide a pinhole detector constructed so that the probability of light actuating the light-sensitive means without first passing through the strip is greatly reduced.

It is another object of this invention to provide a shielding device which cooperates with said detector to permit accurate inspection of moving strip to within a very small distance from its edges. A further object is to provide a shielding device in which no part thereof makes any contact whatsoever with an edge of the strip, and which permits moving strip to be accurately inspected at speeds of 5000 feet per minute or more.

A still further object is to provide a shielding device comprising a shutter having an unusually wide and deep throat section whereby the probability of inadvertent contact between the strip and the shutter is greatly reduced.

An additional object of this invention is to provide an electrical-mechanical closed loop servo system in which a shutter is continuously re-positioned adjacent an edge of a moving strip in response to a continuous signal from sensing means associated with said shutter.

We have discovered that the probability of reflected light, as well as light emitted from the source in planes noncoplanar with planes perpendicular to the surface of the strip and parallel to the direction of strip travel, actuating the light-sensitive means of the detector without first passing through pinholes in the strip can be greatly reduced by constructing the pinhole detector in the following manner. A source of light within a first frequency range is disposed on one side of the strip and transverse to the direction of strip travel. Mounted between said source and said strip is a plurality of parallel photo-luminescent louvers disposed in a plane perpendicular to the surface of the strip and parallel to the direction of strip travel. The louvers absorb all incident light within said first frequency range and, in response to said absorbed light, emit light within a second frequency range. Each of said frequency ranges falls within a different portion of the frequency spectrum, i.e. the ranges do not overlap. Thus, the louvers may be considered to be selective transmission means in which only light from the source which enters the louvers in planes perpendicular to the surface of the strip and parallel to the direction of strip travel passes through the louvers. Light from the source which enters the louvers in other planes emerges therefrom as light within a second frequency range.

Disposed between the strip and the light-sensitive means in the detector base is a substantially monochromatic transmitting filter adapted to pass light within said first frequency range. Inasmuch as said filter absorbs all light except light within said first frequency range and all the light within said first frequency range in the vicinity of the light-sensitive means is in a plane perpendicular to the surface of the strip and parallel to the direction of strip travel, the probability of light from the source actuating the light-sensitive means without first passing through the strip, e.g. by reflection, is very small.

While the detection accuracy of pinhole detectors of the above construction, when provided with shielding means adjacent each edge of the strip, is superior to that of prior detectors provided with the same type of shielding means, we have discovered a novel shielding means which utilizes the optical properties of the above-described detector to improve the effectiveness of shielding at an edge of the strip. Briefly, the shielding means comprises a movable, non-contacting shutter having an upper shield and a lower shield, each of which is constructed of a material which absorbs light within said first frequency range. The top of the upper shield is contiguous to the lower edges of the louvers and the lower shield rides along the base of the detector. Associated with the shutter is sensing means connected to appropriate circuits which actuate electromechanical means to maintain the relative position of the shutter and the edge of the strip constant. Preferably, said sensing means is mounted on the lower shield and comprises a photoresistive cell which is extremely sensitive to light within said second frequency range. In this case, the shields are constructed of a material which, in addition to absorbing light within said first frequency range, transmits light within said second frequency range.

The above-described shielding means effectively prevents light within said first frequency range from passing around an edge of the strip and, in addition, the shutter can be constructed with a wide and deep throat section, thereby substantially reducing the probability of inadvertent contact between any part of the shutter and an edge of the strip.

The features of the invention which we believe to be novel are set forth with particularity in the appended claims. Both the structure and the method of operation of the invention, as well as further objects and advantages thereof, will be better understood by reference to the following description taken in connection with the drawings, in which

Brief description of the drawings

FIGURE 2 is a perspective view, partly in section, of the shielding means.

FIGURE 3 is a sectional view along the lines 3—3 of FIGURE 2.

Description of the preferred embodiments

Figure 1:
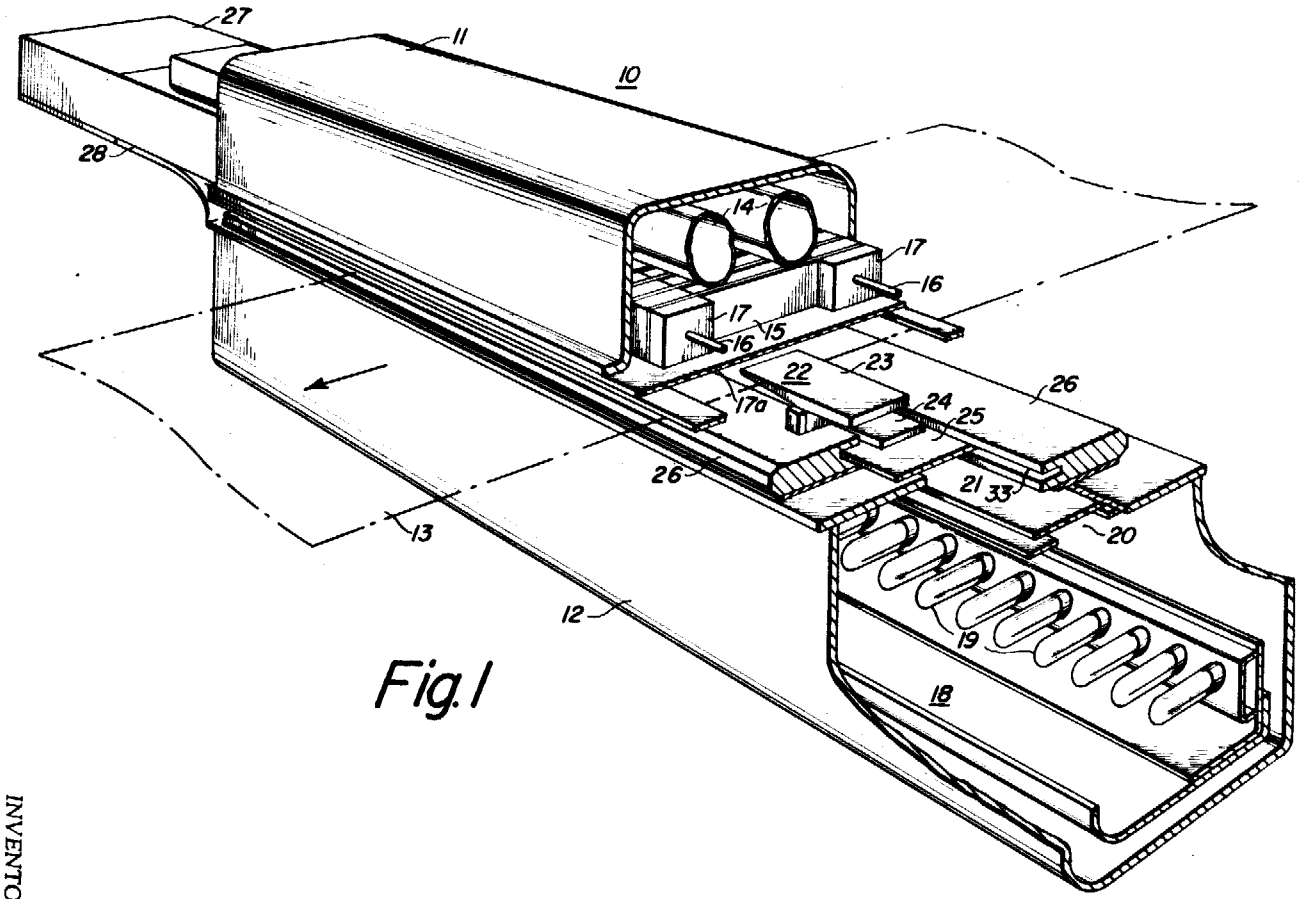
FIGURE 1 is a perspective view, partly in section, of the pinhole detector and a portion of the shielding means.

Referring more particularly to FIGURE 1, a pinhole detector 10 is shown as comprising a detector head 11 and a detector base 12 between which a strip 13 travels. The detector head contains a source of light within a first frequency range, for example fluorescent tubes 14 which emit substantially monochromatic ultraviolet light. Mounted directly below the source is a plurality of parallel photoluminescent louvers 15 disposed in a plane perpendicular to the surface of the strip and parallel to the direction of strip travel. The louvers are journaled on a pair of rods 16 which extend the length of the detector head. Adjacent louvers are separated by means of pairs of square spacers 17 also journaled on said rods.

The louvers and spacers are rendered photoluminescent by covering the surfaces thereof with either a paint or a tape having photoluminescent properties. Each louver and spacer, by reason of its photoluminescent properties, absorbs all incident ultraviolet light and, in response to said absorbed light, emits light within a second frequency range, e.g. light in the near infrared region. A tape having the above-described properties, sold under the trademark "Scotchcal," and identified as #3483 Warning Orange, may be used. Thus, only ultraviolet light from the tubes 14 which enters the plurality of louvers 15 in planes perpendicular to the surface of the strip 13 and parallel to the direction of strip travel passes through the louvers. Incident ultraviolet light, i.e. ultraviolet light from the tubes 14 which enters the plurality of louvers 15 in other planes and thus impinges upon the individual louvers and spacers, emerges therefrom as near infrared light.

As a specific example of the above, we have provided a detector head with one hundred and sixty-eight louvers measuring one inch high by four and one-half inches long by .006 inch thick. Said louvers are separated by three-quarter inch square spacers, one-quarter inch thick. All ultraviolet light leaving the source at an angle greater than fifteen degrees with respect to a plane perpendicular to the surface of the strip and parallel to the direction of strip travel is absorbed by the photoluminescent surfaces of the louvers and the spacers. In response to said absorbed light, light in the near infrared region is emitted.

Ultraviolet and near infrared light leaves the detector head 11 through window 17a. Said window, which is disposed between the head 11 and the strip 13, prevents dirt, dust, etc. from entering the detector head 11.

The detector base 12 comprises a detection chamber 18 in which light-sensitive means, e.g. a plurality of photomultiplier tubes 19, is housed. Reflecting elements, not shown, are provided for directing incoming light toward said photomultiplier tubes. The detection chamber is provided with a slotted aperture 20 in the upper section thereof. The aperture is of sufficient length to accommodate the greatest width of material it is desired to inspect, and is aligned directly below fluorescent tubes 14. The chamber is impervious to all light except that which enters through said aperture.

Mounted directly above the aperture 20 is a substantially monochromatic ultraviolet transmitting filter 21 through which all light entering the detection chamber 18 must pass. The filter is adapted to pass only light within the same frequency range as that emitted by the light source housed in the detector head 11.

The detector is provided with means for preventing light from the source from passing around the edges of the strip. While any of the aforementioned types of shielding means may be employed for this purpose, in the preferred embodiment of the invention shielding means comprising a moveable, non-contacting shutter is utilized. Such a shielding means is shown broadly in FIGURE 1 as comprising a shutter 22 comprising an upper shield 23 and a lower shield 24 mounted on a tail plate 25. The shutter is positioned adjacent an edge of the strip 13 and is adapted to be driven in a path transverse to the direction of strip travel. A pair of rub rails 26 is provided to guide the shutter along the detector base. A housing 27 mounted on an extension plate 28 extending longitudinally of the detector base houses the drive assembly for one of the shutters.

Pinhole detectors of the above construction have proved to be extremely effective in preventing light which has not passed through the strip from entering the detection chamber and actuating the photomultiplier tubes housed therein. Inasmuch as the filter 21 absorbs all light except ultraviolet and substantially all the ultraviolet light in the vicinity of the strip above the detection chamber is in a plane perpendicular to the surface of the strip and parallel to the direction of strip travel, the probability of the photomultiplier tubes being actuated by light which has not first passed through the strip, e.g. by reflection, is very small.

The improved shielding means will next be described in detail. Inasmuch as the mechanical construction of said means is substantially identical for each of the two shielding means necessary for the inspection of moving strip, the description will be limited to means positioned adjacent only one edge of the strip.

As is shown in FIGURE 2, the improved shielding means broadly comprises a shutter 22 comprising an upper shield 23 and a lower shield 24. The shields are constructed of a material which absorbs light in the ultraviolet region and transmits light in the near infrared region. The lower shield is mounted on a tail plate 25 which is slidably mounted in housing 29.

The end of the shutter adjacent the strip is provided with sensing means for producing an electrical signal indicative of the relative position of the shutter with respect to the edge of the strip. In the preferred embodiment of the invention, said sensing means comprises a photoresistive cell 30 securely mounted in the lower shield. Other types of sensing means, e.g. electromagnetic or electrostatic means, may, of course, also be used.

The resistance of the photoresistive cell 30, which is characterized by extreme sensitivity to light in the near infrared region, varies inversely with the intensity of the near infrared light which impinges upon it. The near infrared light, the source of which is the louvers 15 and the spacers 17, passes substantially unimpeded through the upper and lower shields. While the near infrared is available to actuate the photoresistive cell, it cannot enter the detection chamber 18 because the ultraviolet transmitting filter 21 covering the aperture 20 absorbs light in the near infrared region.

The photoresistive cell 30 is electrically connected to a motor control circuit, designated in FIGURE 2 as the square 31. The motor control circuit is in turn electrically connected to reversible motive power means, e.g. D-C torque motor 32, which is adapted to drive the shutter 22 transverse to the direction of strip travel.

To operate the device, the shutter 22 is initially driven inwardly by the D-C motor 32 until a portion of the photoresistive cell 30 is directly beneath the edge of the strip 13. This inward motion is caused by the relatively high intensity of near infrared light initially impinging upon the cell which results in a relatively large output current to the motor control circuit 31. The motor control circuit, the detailed operation of which will be described in full detail later in the specification, causes the motor 32 to drive the shutter inwardly when the light impinging upon the photoresistive cell is of relatively high intensity. The inward motion of the shutter ceases when the output current of the photoresistive cell decreases to a certain predetermined equilibrium value, which occurs when the edge of the strip prevents the near infrared light emitted from the louvers from impinging upon the entire photosensitive surface of the cell, i.e. when the cell is only partially illuminated. The cell is so positioned in the shutter that no portion of the shielding device makes any contact whatsoever with the edge of the strip.

When the output current of the photoresistive cell 30 is at its equilibrium value, the motor control circuit 31 causes the D-C motor 32 to develop no net torque, and the position of the shutter 22 is thus fixed with respect to the position of the edge of the strip 13. As the relative positions of the edge of the strip and the shutter, and therefore the photoresistive cell, vary due to lateral motion of the strip and variations in the width thereof, the output current of the photoresistive cell varies correspondingly. The motor control circuit, in response to deviations from the equilibrium value of photoresistive cell output current, causes the reversible D-C motor to develop a net torque in the direction which re-positions the shutter with respect to the strip so that the output current of the photoresistive cell is again at the equilibrium level.

Figure 5:
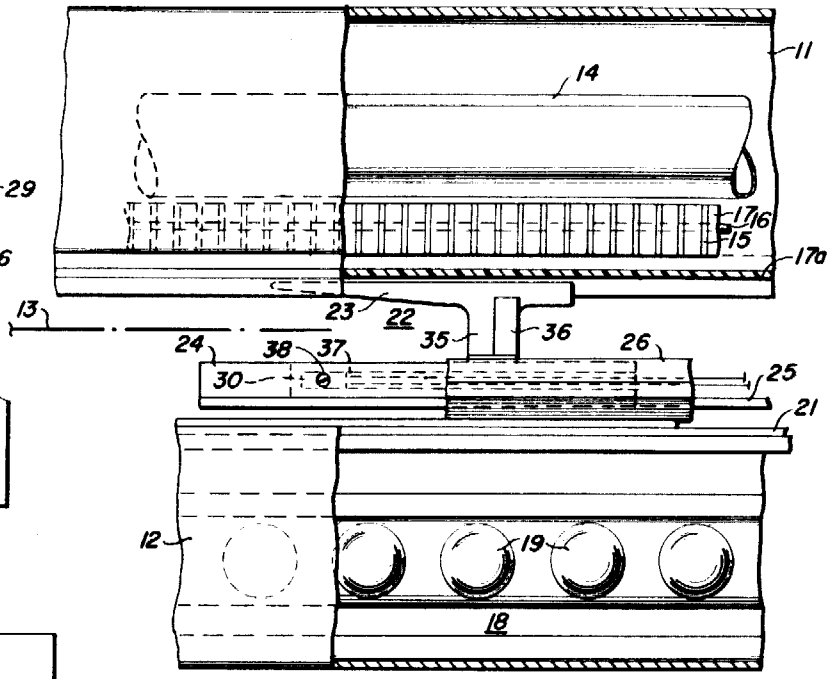
FIGURE 5 is a side elevation view of the shutter and a portion of the pinhole detector.
Figure 6:
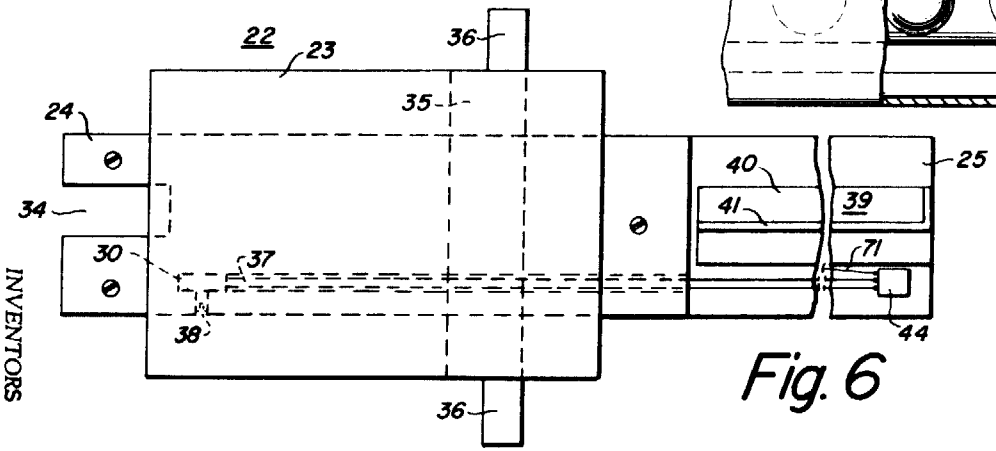
FIGURE 6 is a plan view of the shutter.

As shown in FIGS. 5 and 6, the shutter 22 broadly comprises a tail plate 25 which provides a base upon which the remaining components of the shutter are mounted. Rigidly mounted on the bed of the detector base 12 are rub rails 26 having grooves 33 which serve to guide the shutter and prevent lateral motion thereof. The forward portions of the tail plate and the lower shield are provided with a longitudinal cut 34 so that the strip may be accurately inspected to within a small distance from its edges.

Rigidly mounted on the front portion of the tail plate is the lower shield 24. The upper surface of the lower shield is below the top of rub rails 26, thereby protecting said shield from the strip. The upper shield is connected to the lower shield by supporting member 35, which may, as shown, be integral with the upper shield. Mounted on each side of the supporting member is a light shield 36 which aids in preventing reflected light, as well as ambient light, from entering the detection chamber 18.

The upper and lower shields 23 and 24, supporting member 35, and light shields 36 are preferably constructed of transparent red acrylic plastic which passes light in the near infrared and absorbs light in the ultraviolet region. All surfaces thereof are highly polished to permit maximum ultraviolet light absorption and near infrared light transmission.

The above-described shields and supporting member effectively prevent ultraviolet light from passing around an edge of the strip. In addition, the throat formed by said components is relatively wide and deep, thus greatly reducing the probability of damage to the shutter by contact thereof with the moving strip.

The photoresistive cell 30 is mounted in the front portion of the lower shield by providing therein a cylindrical housing 37 into which the cell is inserted. The cell is secured by providing a pressure adjustment screw 38 which extends inwardly from the side of the lower shield.

Mounted on the rear portion of the tail plate 25 and extending lengthwise along the center thereof is a T-bar 39 comprising a base 40 and a vertical section 41. The rear of the vertical section is curved to provide a mechanical stop. A button head cap screw 42 is mounted on the base 40 and serves as a cam to actuate limit switch 43, which depends from the roof of housing 29. Rigidly mounted at the rear of the tail plate is an electrical connection base 44 to which the wires from the photoresistive cell are connected.

The shutter housing 29 broadly comprises side plates 45 and 46, cover 47, bottom plate 48, and motor mounting bracket 49. The housing 29 is mounted on the detector base extension 50. The motor mounting bracket 49 is rigidly attached to the top surfaces of side plates 45 and 46, and has its forward section 51 bent downwardly along the front walls of said side plates. Forward section 51 is provided with a slot 52 through which the vertical section 41 of T-bar 39 passes during inward or outward movement of shutter 22.

Mounted on the motor mounting bracket is the motor housing 53, which provides a base for the motor 32. The shaft 54 and drive wheel 55 of the motor pass through a circular opening 56 disposed in the bottom of the motor housing and extending through the motor mounting bracket 49 into the shutter housing. Mounted on one wall of the motor housing is a conduit 57 through which the electrical conductors connecting the motor and the photoresistive cell to the motor control circuit 31 are passed. A cover for the motor housing may of course be provided.

Figure 4:
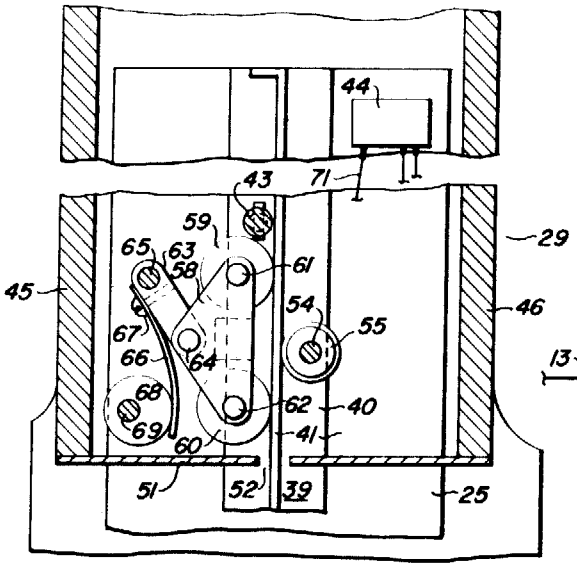
FIGURE 4 is a sectional view along the lines 4—4 of FIGURE 3 showing the details of the drive assembly.

A hinge plate assembly, shown in detail in FIGURES 3 and 4, is disposed below the motor mounting bracket and comprises a hinge plate 58 to which are pinned guide rollers 59 and 60 by pins 61 and 62, respectively. The hinge plate is rotatably mounted on spring bar 63 by pin 64, and the spring bar is rotatably mounted on the spring bar stud 65. The upper portion of the shank of the spring bar stud is threaded and passes through the motor housing 53 and motor mounting bracket 49 and is bolted thereto. The spring 66 is attached to the spring bar 63 by screw 67 and a cam wheel 68 having an off-center shaft 69 is disposed so that it makes circumferential contact with the free end of the spring. The shaft 69 of the cam wheel passes through the motor mounting bracket and is mounted on the motor housing. A slotted surface 70 is provided at the top of the shaft so that it can be rotated.

The hinge plate assembly operates in combination with the drive wheel 55 of motor 32 to drive the shutter 22 inwardly and outwardly. The vertical section 41 of T-bar 39 is engaged in frictional contact between drive wheel 55 and guide rollers 59 and 60. The pressure exerted by the drive wheel and the guide rollers against section 41 may be varied by rotating the shaft 69 of cam wheel 68.

One end of a flexible connector 71 is connected to connection base 44. Connector 71, which conducts current to and from the photoresistive cell, has its other end connected to a connection base (not shown) rigidly mounted on the lower side of motor mounting bracket 49. Suitable conductors connected thereto pass through conduit 57 to motor control circuit 31.

The motor control circuit 31 broadly comprises the four following functional circuits: (1) an output power stage; (2) driver or amplifier stages; (3) a height to width converter; (4) a pulse generator. The output power stage comprises power transistors 101 and 102 and a junction diode 103. Transistor 101 is of the p-n-p type and has an emitter electrode 104, a collector electrode 105, and a base electrode 106. Transistor 102 is also of the p-n-p type and has an emitter electrode 107, a collector electrode 108, and a base electrode 109. Transistors 101 and 102 function like a pair of interlocked single pole switches connected so that when one switch is open, the other switch is closed. That is, when transistor 101 is in saturated conduction, transistor 102 is cut off, and vice versa. A conductor 110 connects the junction 111 of diode 103 and the emitter 107 of transistor 102 to conductor 112 and, assuming limit switch 43 is closed, to one side of the motor 32, the other side of the motor being connected to ground. Connected in parallel with limit switch 43 is a resistor 164 and a junction diode 165. Connected to the emitter 104 of transistor 101 is a source 113 of positive D-C potential, e.g. +24 volts. Connected through load resistor 114 to the collector 108 of transistor 102 is a source 115 of negative D-C potential equal in magnitude to that of source 113, e.g. −24 volts.

If it is assumed that transistor 101 is initially in saturated conduction, current flows from positive source 113 through transistor 101. The collector courrent leaves the collector 105 and flows substantialy unimpeded through diode 103, which is forward biased to the collector current from transistor 101, to junction 111. The base 109 of transistor 102 is connected to the positive side of diode 103 by conductor 116 and the emitter 107 is connected to the negative side thereof, so that the small voltage drop across the diode 103 when the saturated collector current of transistor 101 flows therethrough suffices to reverse bias transistor 102 beyond cut-off.

If transistor 101 is cut off, only leakage current flows in the base circuit thereof, and the collector current is quite small. The voltage drop across diode 103 is therefore negligible, and transistor 102 is no longer reverse biased. Sufficient current is suplied to the base 109 through resistor 117 to drive transistor 102 into saturation.

The operation of the output power stage is predicated upon the low forward impedance of junction diodes and the switching properties of transistors, as is well known in the art. That is, both a forward biased junction diode and a transistor in saturated conduction may be considered substantially short circuits. Thus, when transistor 101 is in saturated conduction and transistor 102 is cut off, current flows substantially unimpeded from positive source 113 through transistor 101 and diode 103 directly into motor 32, and the positive D-C voltage at source 113 is, for all practical purposes, directly across said motor. Similarly, when transistor 101 is cut off and transistor 102 is in saturated condition, current flows substantially unimpeded from motor 32 through transistor 102 into negative source 115, and the negative D-C voltage at source 115 is, for all practical purposes, directly across said motor. Since transistors 101 and 102 are interlocked, power is continuously supplied to motor 32.

Figure 8:
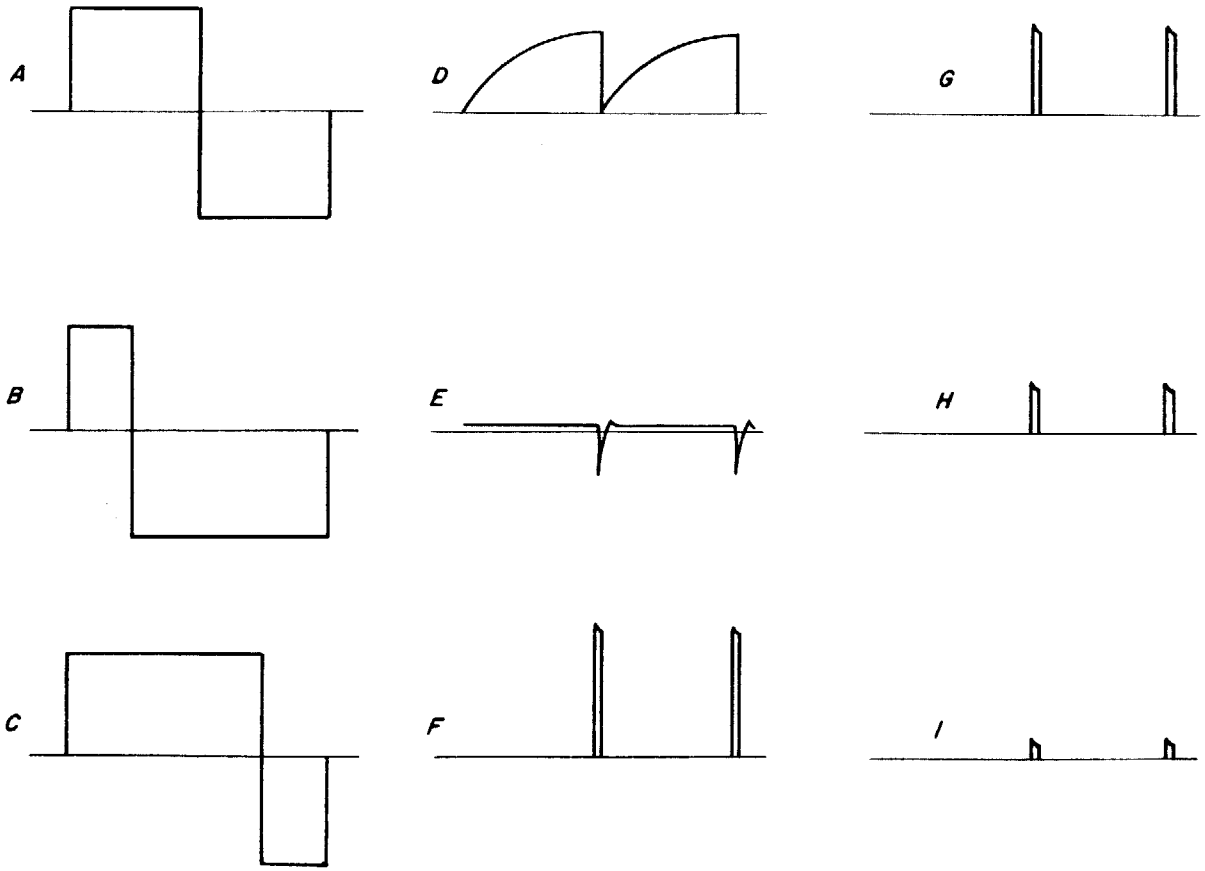
FIGURE 8 shows graphically the wave forms of the voltages at various points in the circuit.

Transistors 101 and 102 are alternately driven into saturation at a predetermined frequency, e.g. 500 cycles per second. If each transistor is driven into saturated conduction for 50% of each cycle, the positive and negative D-C voltage sources 113 and 115 are alternately placed across the motor 32 for equal periods of time by the switching action of said transistors. Provided the frequency of switching is sufficiently high, the shaft 54 of motor 32 will not rotate, since the torque developed is of insufficient magnitude to overcome the mechanical inertia of the motor and its load, The equilibrium condition, i.e. the condition in which transistors 101 and 102 are driven into saturated conduction for 50% of each cycle, occurs when the shutter 22 is properly positioned with respect to the edge of the moving strip as determined by the intensity of the near infrared light impinging upon the photoresistive cell 30. The voltage waveform across the motor at equilibrium is shown graphically in FIGURE 8(A). Should the shutter 22 be momentarily improperly positioned, near infrared light of a greater or lesser intensity will impinge upon the photoresistive cell 30, and transistors 101 and 102 will no longer be in saturated conduction for 50% of each cycle. FIGURES 8(B) and 8(C) show the voltage waveform across the motor 32 during such non-equilibrium conditions. During non-equilibrium conditions, one of the D-C voltage sources 113 and 115 is across the motor for a majority of each cycle, and a net torque is developed by the motor 32 which causes the shaft 54 to rotate in such a direction that shutter 22 is re-positioned in its equilibrium position. The direction and magnitude of the torque developed depends upon the intensity of the near infrared light impinging upon the photoresistive cell 30.

The driver or amplifier stages comprise p-n-p transistor 118 and n-p-n transistor 119 and serve to reverse bias transistor 101 in response to an input control signal dependent upon the output current from cell 30. Transistor 118 has an emitter electrode 120, a collector electrode 121, and a base electrode 122. Transistor 119 has an emitter electrode 123, a collector electrode 124, and a base electrode 125. Transistors 119, 118, and 101 are directly coupled to each other so that when transistor 119 is in saturated conduction, transistors 118 and 101 are in saturated conduction, also. Similarly, when transistor 119 is cut off, transistors 118 and 101 are cut off, also. In other words, the state of conduction of transistor 119 determines the state of conduction of transistors 118, 101, and because transistors 101 and 102 are interlocked, 102.

The base 125 of transistor 119 is connected to junction 126. In the absence of a negative potential at junction 126, transistor 119 is in saturated conduction due to the current supplied to its base 125 through resistor 127. Current then flows from source 113 through resistor 128 and through transistor 119 to ground. The base 122 of transistor 118 is connected to resistor 128 at junction 129. The voltage drop across resistor 128 when transistor 119 is in saturated conduction causes the potential at junction 129 to become less positive, and thereby provides forward bias to transistor 118. The collector 124 of transistor 119 supplies sufficient base current to the base 122 of transistor 118 to drive it into saturated conduction. Connected between the emitter 120 of transistor 118 and the base 106 of transistor 101 is a current limiting resistor 130, which limits the emitter current of the transistor 118 to a safe value. At the junction 131 of resistor 130 and base 106, a resistor 132 is connected to source 113. Current from source 113 is conducted through resistors 132 and 130 through transistor 118 to ground. The voltage drop across resistor 132 when transistor 118 is in saturated conduction causes the potential at junction 131 to become less positive, and thereby provides sufficient forward bias to transistor 101 to drive it into saturated condition. As previously explained, transistor 102 is cut off when transistor 101 is in saturated conduction.

A negative potential at junction 126 suffices to reverse bias transistor 119 beyond cut off. The potential at junction 129 then becomes more positive, inasmuch as there is a very small voltage drop across resistor 128 when transistor 119 is cut off. This increase in potential at junction 129 cuts off transistor 118. The potential at junction 131 then becomes more positive, inasmuch as the voltage drop across resistor 132 is very small when transistor 118 is cut off. The increase in potential at junction 131 cuts off transistor 101, thereby permitting transistor 102 to be driven into standard conduction.

It can be seen from the foregoing that the presence of a negative potential at junction 126 for 50% of each cycle causes the sources of positive and negative potential 113 and 115, respectively, to be alternately placed across the armature of motor 32 for equal periods of time. Such a condition prevails when the shutter 22 is properly positioned with respect to the edge of the strip 13, and no torque is developed by the motor 32. Furthermore, it can be seen that by varying the percentage of each cycle during which a negative potential is present at junction 126, either the positive source 113 or the negative source 115 will be placed across the motor 32 for more than 50% of each cycle. This condition prevails when the shutter 22 is improperly positioned with respect to the edge of the strip 13, and a net torque is developed by the motor 32 which repositions the shutter 22 in its equilibrium position.

The output current from the photoresistive cell 30, in response to the intensity of the near infrared light impinging upon it, determines the percentage of each cycle during which a negative potential is present at junction 126 by means of circuits now to be described. An n-p-n transistor 133 has an emitter electrode 134, a collector electrode 135, and a base electrode 136. The emitter 134 is connected to junction 137, and a capacitor 138 is connected between junctions 137 and 126. A load resistor 139 is connected between junction 137 and ground. Connected to the base 136 at a junction 140 is a leak resistor 141. The photoresistive cell 30 is connected to junction 140 by conductor 142. Connected between junctions 137 and 140 is a filter capacitor 139a.

An n-p-n transistor 143 having an emitter electrode 144, a collector electrode 145, and a base electrode 146 has its collector 145 connected by conductor 147 to a junction 148 which is connected to collector 135 of transistor 133 by conductor 149. A resistor 150 is connected between junction 148 and a source 151 of regulated positive D-C potential, e.g. +24 volts. The emitter 144 of transistor 143 is connected to ground by conductor 152. Connected to the base *146* of transistor 143 at junction 153 is a resistor 154 which connects the base 146 to source 151.

A unijunction transistor 155 having an emitter electrode 156 and first and second base electrodes 157 and 158, respectively, has its base 157 connected to ground and its base 158 connected to source 151 through resistor 159. At a junction 160 is a potentiometer 161 connected in series with a resistor 161a, whereby the emitter 156 is connected to source 151. Connected between junctions 160 and 153 is a capacitor 162.

The operation of the circuits is substantially as follows. Transistor 155 operates in conjunction with potentiometer 161, resistor 161a, and capacitor 162 to produce a sawtooth wave voltage, shown in FIGURE 8(D), at junction 160. As is well known in the art, the interbase resistance of transistor 155 is dependent upon its emitter current. This resistance is very high until the voltage between the emitter 156 and the base 158 reaches a "firing potential," which is approximately two-thirds the voltage between base 157 and base 158, at which time the emitter current flows, and the resistance of base 157 rapidly decreases to a low value. As the resistance of base 157 decreases, the voltage at the emitter 156 also decreases until it is below a minimum or cut off value, at which time base 157 returns to its high resistance state and the emitter current ceases to flow.

If it is assumed that the power is just turned on, negligible current flows through transistor 155, since the voltage at its emitter 156 is zero. The emitter voltage increases as capacitor 162 charges through potentiometer 161, resistor 161a, and the base-emitter circuit of transistor 143. During this portion of the cycle, i.e. the time during which the voltage at junction 160 is increasing, the charging current through the base-emitter circuit of transistor 143 provides sufficient forward bias to maintain transistor 143 [is] *in* saturated conduction. Junction 153 is essentially at ground potential, since the voltage drop from the base 146 to the emitter 144 is negligible during saturation. When the voltage at the emitter 156 reaches the firing potential, the resistance of base 157 rapidly decreases to a low value, and the positive charge stored in capacitor 162 rapidly discharges through the emitter 156 and base 157 to ground until the emitter voltage decreases to below the cut off value.

Inasmuch as the voltage across a capacitor cannot change instantaneously and the voltage at junction 160 has decreased almost instantaneously, the voltage at junction 153 must instantaneously decrease an equal amount. Because the voltage at junction 153 was approximately at ground potential during the charging cycle of capacitor 162, it must decrease below ground potential at the start of the discharging cycle of capacitor 162. The negative voltage at junction 153 cuts off transistor 143 until said voltage can discharge, the discharge time being primarily a function of capacitor 162 and resistor 154. The value of resistor 154 should be such that transistor 143 is cut off for about 10% of each cycle, although other values may, of course, be [premissible] *permissible*. The waveform of the voltage at junction 153 is shown in FIGURE 8(E).

As previously pointed out, when the transistor 143 is in saturated condition the voltage drop across it is negligible. Since transistor 133 is in series with resistor 139 and the combination is in parallel with transistor 143, transistor 133 and resistor 139 are shorted out during that period of each cycle during which transistor 143 is in saturated conduction. When transistor 143 is cut off, the voltage at junction 148 is nearly equal to that of the source 151, and current may flow through transistor 133. The waveform of the voltage at junction 148 is shown in FIGURE 8(F).

The photoresistive cell 30 is connected to an adjustable voltage supply, broadly designated as 163, which is adjusted to cause the photoresistive cell to supply adequate forward bias through conductor 142 to the base 136 of transistor 133 when the cell is fully illuminated. When the system is operating, the base bias varies from a few microamperes to about four hundred microamperes at full illumination. The magnitude of the current through transistor 133 is modulated by the magnitude of the base bias. From the foregoing discussion, it can be seen that the voltage at junction 137 is a series of narrow pulses, each having an amplitude dependent upon the intensity of the near infrared light impinging upon the photoresistive cell 30. The waveform of this voltage is shown in FIGURES 8(G), (H), and (I) for three different intensities of light. FIGURE 8(G) shows the voltage when the light intensity is relatively large. FIGURE 8(H) shows the voltage at the equilibrium light intensity, and FIGURE 8(I) shows the voltage when the light intensity is relatively small.

Transistor 119, which was previously considered in the driver stages, operates in conjunction with capacitor 138 and transistor 133 to convert the pulses of varying amplitude and constant width at junction 137 to pulses of varying width and constant amplitude at junction 131. When a pulse arrives at junction 137 the capacitor 138 rapidly charges through resistor 150, transistor 133, and the base-emitter circuit of transistor 119. Inasmuch as transistor 119 is in saturated conduction by reason of the forward bias supplied to its base 125 through resistor 127, junction 126 remains at approximately ground potential. When the trailing edge of the pulse arrives, i.e. when transistor 133 is cut off by the short-circuiting action of transistor 143, the current through resistor 139 decreases instantaneously to a value determined by the impedance of the discharging circuit of capacitor 138, i.e. the series impedance of resistor 127, capacitor 138, and resistor 139. The resistance of resistor 127 is large compared to that of resistor 139, and the voltage at junction 137 therefore decreases instantaneously to a value slightly above ground potential. Inasmuch as the total voltage across capacitor 138 cannot change instantaneously, the voltage at junction 126, which was previously slightly above ground potential, must instantaneously decrease by an amount equal to the decrease in voltage at junction 137. The voltage at junction 126 thus becomes negative until capacitor 138 can discharge through resistors 127 and 139.

The negative voltage at junction 126 suffices to reverse bias transistor 119 beyond cut off. The percentage of each cycle during which transistor 119 is cut off depends upon the magnitude of the voltage at junction 126, which in turn depends upon the magnitude of the voltage at junction 137. The latter voltage depends upon the emitter current of transistor 133, which is dependent upon the intensity of the near infrared light impinging upon the photoresistive cell 30. The values of resistor 127 and capacitor 138 are chosen so that when the cell 30 is fully illuminated the RC time constant is long enough to keep transistor 119 reversed biased beyond cut-off until another pulse arrives at the emitter 134 of transistor 133. With less than maximum illumination of cell 30, transistor 119 is cut off for a proportionately shorter period of time. For example, when the illumination is such that the equilibrium value of output current flows from the cell, i.e. when the shutter 22 is properly positioned with respect to the edge of the strip 13, transistor 119 is reverse biased beyond cut-off for 50% of each cycle.

The preferred embodiment of the invention operates in substantially the following manner. The motor 32 is connected so that when a positive potential is placed across its armature due to the conduction of transistor 101, the shaft 54 tends to rotate in a direction which would cause the shutter 22 to be driven inwardly, i.e. toaway from the strip. When a negative potential is placed across its armature due to the conduction of transistor 102, the shaft 54 tends to rotate in a direction which would cause the shutter 22 to be drawn inwardly, i.e. toward the strip.

The photoresistive cell 30 is provided with power by an adjustable power supply 163. Between the cell and power supply 163 is a relay 166 which may be manually opened to de-energize the cell.

Prior to operating the device, voltage supply 163 is adjusted so that there is no output current from the photoresistive cell 30. The system is now energized, and the shutter is immediately driven to its fully retracted position inasmuch as there is no input signal to prevent transistor 101 from conducting, and thereby placing a positive potential across the armature of motor 32, for the entire cycle. In its fully retracted position, the head of screw 42 mounted on the base 40 of T-bar 39 contacts and opens limit switch 43, throwing the parallel combination of junction diode 165 and resistor 164 into the circuit. The high impedance of the diode 165, which is reverse biased, and resistor 164 decreases the armature current to a value of insufficient magnitude to cause further rotation of the shaft 54 of motor 32.

The voltage supply 163 is now adjusted to increase the current through the cell 30. The increasing current results in the reverse biasing of transistor 101 for a portion of each cycle. During that portion of the cycle in which transistor 101 is reverse biased a negative potential is placed across the armature of motor 32. Inasmuch as diode 165 is then forward biased, the armature current is relatively unimpeded, and sufficient torque is developed by motor 32 to drive the shutter 22 inwardly and thereby close limit switch 43. The voltage supply 163 is further adjusted until the cell 30 is supplying sufficient current to advance the shutter 22 to the edge of the strip 13 without any oscillatory motion of the shutter.

After voltage supply 163 has been adjusted, relay 166 is opened and the shutter 22 is driven to its fully retracted position. To begin inspection of the strip 13, relay 166 is closed, thereby closing the photoresistive cell circuit. Inasmuch as the cell 30 is fully exposed to the near infrared light emitted from the louvers 15 and spacers 17, a large output current flows from cell 30 to the base 136 of transistor 133. The current impulses at junction 137 are therefore very large, and the voltage drop at junction 126 when the trailing edge of the pulse arrives at junction 137 is sufficient to cut off transistor 101 for the entire cycle. Transistor 102 is therefore in saturated conduction for the entire cycle, and the negative potential of source 115 is across the armature of motor 32 for the entire cycle. The shaft 54 of motor 32 develops a high torque which drives the shutter 22 inwardly until a portion of the cell 30 is no longer illuminated by near infrared light from the louvers 15 and the spacers 17. Movement of the shutter stops when the output current from cell 30 is just sufficient to reverse bias transistor 101 beyond cut-off for 50% of each cycle.

As the intensity of the near infrared light impinging upon the photoresistive cell 30 varies due to lateral motion of the strip 13 and variations in the width thereof, the output current from cell 30 varies correspondingly and, by means of the motor control circuit 31, causes motor 32 to re-position shutter 22 accurately with respect to the edge of the strip. At no time does any portion of the shutter make contact with the edge of the strip.

The aforementioned motor control circuit has several safety features incorporated therein, so that the most common malfunctions thereof will not result in damage to the strip. For example, since the most common failure of transistors and diodes is shorting within the semiconductor material, the circuit has been designed so that the shutter will be immediately retracted should shorting occur in any one of transistors 101, 118, 119, 133, 143, 155, or diode 103. In addition, any open circuit in the photoresistive cell circuit or failure of the light source causes the shutter to be immediately retracted.

Figure 7:
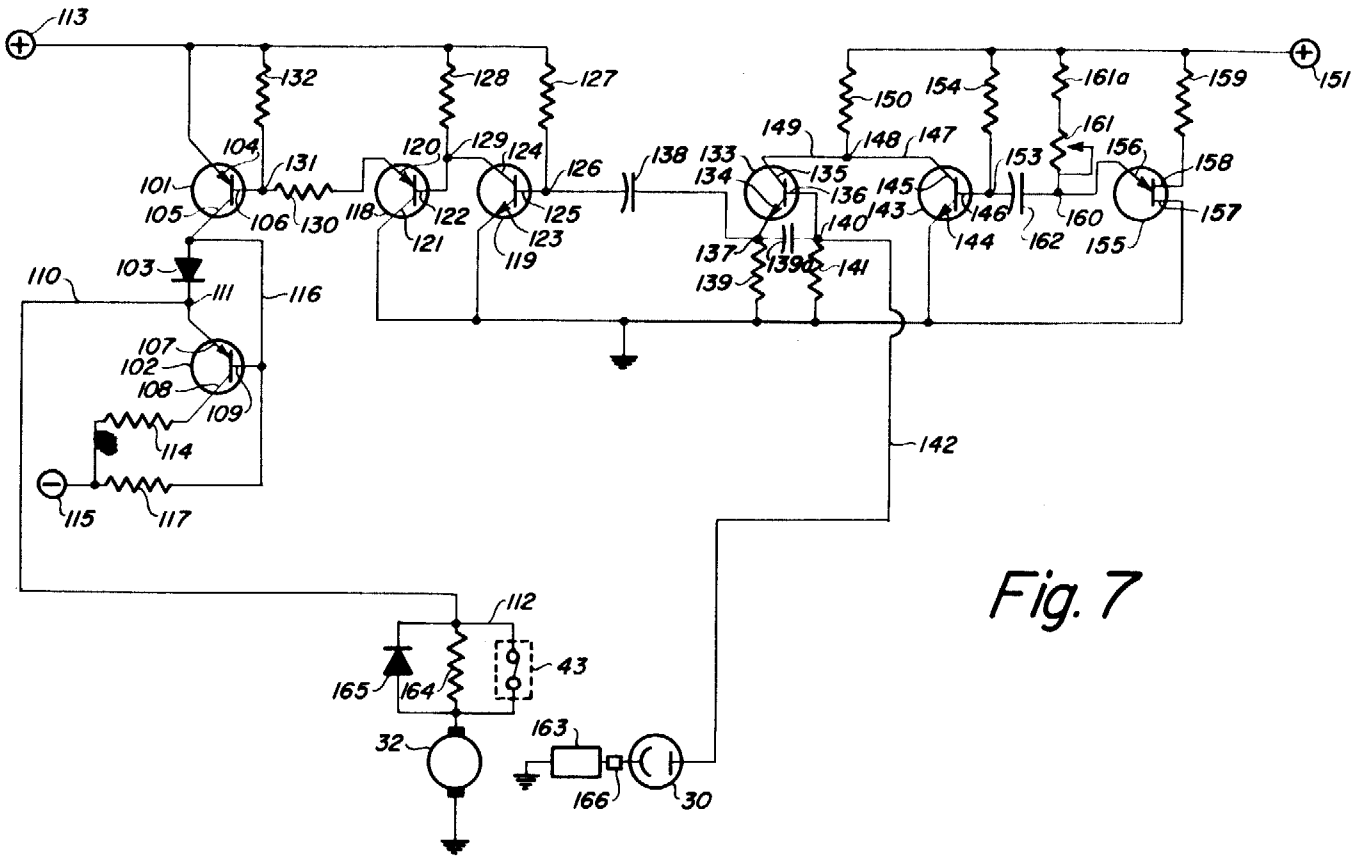
FIGURE 7 is a schematic of a motor control circuit.

The following components may be utilized in the circuit shown in FIG. 7.

| | |
|---|---|
| Resistor **114** | 5 ohms. |
| Resistor **117** | 125 ohms. |
| Resistor **127** | 100K ohms. |
| Resistor **128** | 4.7K ohms. |
| Resistor **130** | 270 ohms. |
| Resistor **132** | 15 ohms. |
| Resistor **139** | 10K ohms. |
| Resistor **141** | 150K ohms. |
| Resistor **150** | 2.2K ohms. |
| Resistor **154** | 4.7K ohms. |
| Resistor **159** | 330 ohms. |
| Potentiometer **161** | 25K ohms. |
| Resistor **161a** | 25K ohms. |
| Resistor **164** | 40 ohms. |
| Capacitor **138** | .1 mfd. |
| Capacitor **139a** | .01 mfd. |
| Capacitor **162** | .05 mfd. |
| Diodes **103**, **165** | Type 40–H. |
| Transistors **101**, **102** | Type 2N278–DS501–2N1100. |
| Transistor **118** | Type 2N1125. |
| Transistor **119** | Type 2N1012. |
| Transistor **133** | Type 2N78–2N35. |
| Transistor **143** | Type 2N356–A. |
| Transistor **155** | Type 2N491. |

It is to be understood that the values for the circuit components may vary according to the design for any particular application. The foregoing specifications were given for the purpose of example only, and are suitable for operations in which the control circuit has a repetition rate of 500 pulses per second.

The aforementioned motive power means utilized to drive the shutter should preferably be a D-C torque motor. Because of the high output torque to inertia ratio that is possible, and also because of the small input power required to obtain a given torque, such a motor is ideally suited for use in the instant device. A further advantage lies in the very fast torque vs. time response inherent in D-C torque motors.

Changes and modifications of this invention will undoubtedly occur to those skilled in the art and we therefore do not wish to be limited to the exact embodiments shown and described but may use such substitutions, modifications or equivalents thereof as are embraced within the scope of our invention or as pointed out in the claims.

We claim:

1. In apparatus for detecting imperfections in moving strip by photoelectric means, (a) a source of light within a first frequency range positioned on one side of said strip, (b) first light-senstive means positioned on the other side of said strip, (c) selected transmission means disposed between said source and said strip for converting to light within a second frequency range light within said first frequency range emitted from said source toward said strip in planes noncoplanar with planes substantially perpendicular to the surface of the strip and parallel to the direction of strip travel, (d) a shutter positioned adjacent each edge of the strip and adapted to be driven transverse to the direction of strip travel, (e) said shutter comprising a first shield and a second shield, (f) said first shield extending inwardly of the edge of the strip between said strip and said first light-sensitive means, (g) said second shield extending inwardly of the edge of the strip between said strip and said selective transmission means, (h) said shields being characterized by the property of absorbing light within said first frequency range, said second shield further being characterized by the property of transmitting light within said second frequency range.

(i) second light-sensitive means sensitive to light within said second frequency range and positioned in said first shield to receive light which passes around the edge of the strip, (j) motive power means for driving said shutter, (k) control means for energizing said motive power means in response to the intensity of light impinging upon said second light-sensitive means, and (l) means disposed between said strip and said first light-sensitive means for transmitting only light within said first frequency range.

2. In apparatus for detecting imperfections in moving strip by photoelectric means, (a) a source of substantially monochromatic ultraviolet light positioned on one side of said strip, (b) light-sensitive means positioned on the other side of said strip, (c) a plurality of substantially equidistantly spaced louvers disposed between said source and said strip, (d) said louvers being characterized by the property of absorbing incident ultraviolet light and, in response to said absorbed light, emitting light in the near infrared region, (e) each of said louvers being disposed in a plane substantially perpendicular to the surface of the strip and parallel to the direction of strip travel, (f) a shutter positioned adjacent each edge of the strip and adapted to be driven transverse to the direction of strip travel, (g) said shutter comprising a first shield and a second shield, (h) said first shield extending inwardly of the edge of the strip between said strip and said light-sensitive means, (i) said second shield extending inwardly of the edge of the strip between said strip and said louvers, (j) said shields being characterized by the property of absorbing ultraviolet light, said second shield further being characterized by the property of transmitting near infrared light, (k) a photoresistive cell sensitive to near infrared light and positioned in said first shield to receive light which passes around the edge of the strip, (l) motive power means for driving said shutter, (m) control means for energizing said motive power means in response to the intensity of the light impinging upon said photoresistive cell, and (n) means disposed between said strip and said light-sensitive means for transmitting only ultraviolet light.

3. An apparatus as recited in claim 1, in which said selective transmission means comprises a plurality of substantially equidistantly spaced louvers characterized by the property of absorbing incident light within said first frequency range and, in response to said absorbed light, emitting light within said second frequency range.

*4. In apparatus for detecting imperfections in moving strip by photoelectric means,*

*(a) means, disposed on one side of said strip, adapted to emit light within a first and a second frequency range; said means further being adapted so that light within said first frequency range impinges upon said*

*strip in planes substantially perpendicular to the surface of said strip and parallel to the direction of travel thereof;*

*(b) first light-sensitive means positioned on the other side of said strip,*

*(c) a shutter positioned adjacent each edge of the strip and adapted to be driven transverse to the direction of strip travel,*

*(d) said shutter comprising a first shield and a second shield,*

*(e) said first shield extending inwardly of the edge of the strip between said strip and said first light-sensitive means,*

*(f) said second shield extending inwardly of the edge of the strip between said strip and means (a),*

*(g) said shields being characterized by the property of absorbing light within said first frequency range, said second shield further being characterized by the property of transmitting light within said second frequency range,*

*(h) second light-sensitive means sensitive to light within said second frequency range and positioned in said first shield to receive light which passes around the edge of the strip,*

*(i) motive power means for driving said shutter,*

*(j) control means for energizing said motive power means in response to the intensity of light impinging upon said second light-sensitive means, and*

*(k) means disposed between said strip and said first light-sensitive means for transmitting only light within said first frequency range.*

*5. In apparatus for detecting imperfections in moving strip by photoelectric means,*

*said apparatus comprising:*

*(i) means, disposed on one side of said strip, adapted to emit light within a first and a second frequency range; and*

*(ii) means, disposed on the other side of said strip, adapted to transmit only light within said first frequency range into the detection chamber of said apparatus;*

*an improved shutter comprising:*

*(a) a first shield disposed between means (ii) and said strip and extending inwardly of an edge of said strip;*

*(b) a second shield disposed between means (i) and said strip and extending inwardly of said edge of said strip;*

*(c) said shields being characterized by the property of absorbing light within said first frequency range, said second shield further being characterized by the property of transmitting light within said second frequency range; and*

*(d) means for controlling the position of said shutter relative to said edge of said strip comprising means, positioned on said second shield, sensitive to light within said second frequency range.*

References Cited

The following references, cited by the Examiner, are of record in the patented file of this patent or the original patent.

UNITED STATES PATENTS

| | | | |
|---|---|---|---|
| 2,182,987 | 12/1939 | Hopkins | 250—237 |
| 2,981,845 | 4/1961 | Larew et al. | 250—219 |
| 3,031,351 | 4/1961 | McIlvaine | 250—237 |
| 3,065,347 | 11/1962 | Bossart | 250—83.3 |
| 3,128,385 | 4/1964 | Scharf et al. | 250—219 |

RALPH G. NILSON, *Primary Examiner.*

M. ABRAMSON, *Assistant Examiner.*